(No Model.)
T. THOMPSON.
REIN GUARD.
No. 566,818. Patented Sept. 1, 1896.
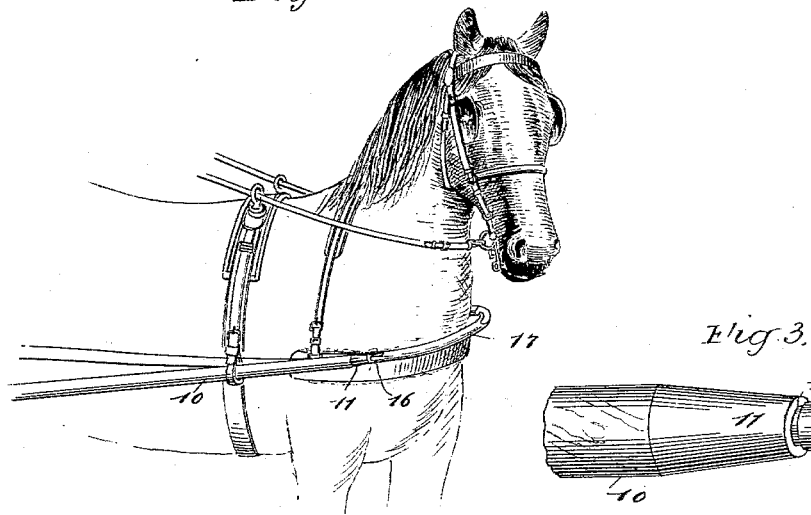
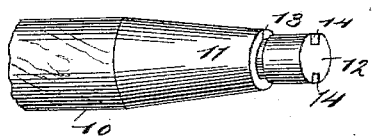
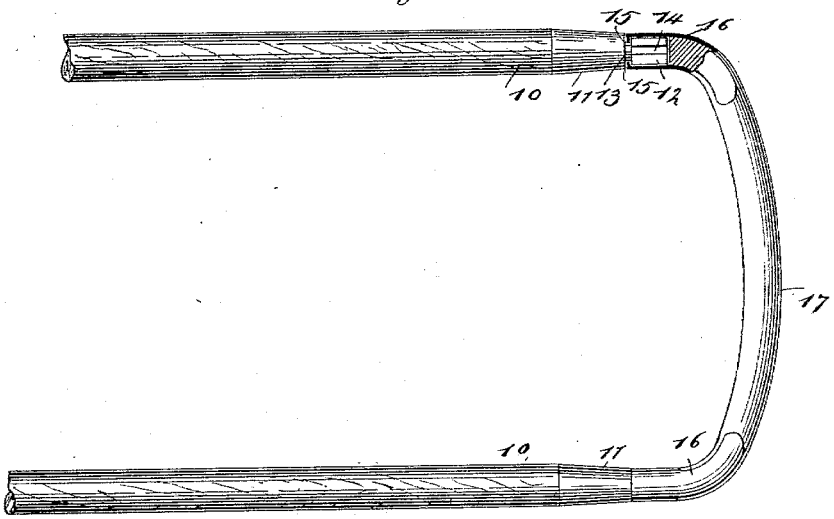
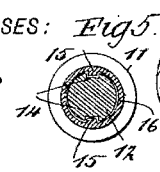
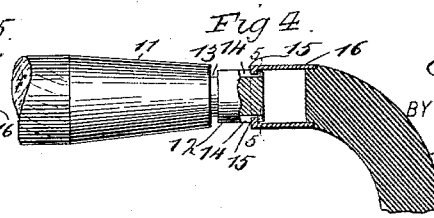
WITNESSES:
Paul Jahal
C. Sedgwick
INVENTOR
T. Thompson
BY
Munn & Co
ATTORNEYS.

UNITED STATES PATENT OFFICE.

THOMAS THOMPSON, OF NEW LONDON, WISCONSIN.

REIN-GUARD.

SPECIFICATION forming part of Letters Patent No. 566,818, dated September 1, 1896.

Application filed June 12, 1894. Serial No. 514,295. (No model.)

*To all whom it may concern:*

Be it known that I, THOMAS THOMPSON, of New London, in the county of Waupaca and State of Wisconsin, have invented a new and Improved Rein-Guard, of which the following is a full, clear, and exact description.

My invention relates to improvements in that class of rein-guards which are designed to prevent the reins of a harness from catching beneath the ends of the thills of a vehicle. This is a common occurrence, especially in fly-time, as the reins are thrown about by the horse when slack and are quite likely to loop over the end of a thill.

My invention is intended to connect the ends of the shafts together, so as to form a continuous smooth connection which will prevent the reins, by any possibility, from being caught on the shaft ends, and this arrangement also prevents the horse from catching a shaft around a post and breaking it when he is hitched. It prevents the end of either shaft from being run into another horse in case of collision and in case the belly-band of a two-wheeled vehicle breaks, and it prevents the shafts from swinging up over the horse's back and throwing out the occupants of the vehicle, a common occurrence, as the guard catches on the neck of the animal and the shafts resume a nearly normal position.

To these ends my invention consists in certain features of construction and combinations of parts, as will be hereinafter described and claimed.

Reference is to be had to the accompanying drawings, forming a part of this specification, in which similar figures of reference indicate corresponding parts in all the views.

Figure 1 is a perspective view of my improved guard as applied to the shafts or thills of a vehicle and to a horse. Fig. 2 is a broken plan view of the front ends of the thills, with a portion of the guard broken away to show the manner in which it connects the thill-shafts or thill ends. Fig. 3 is a broken perspective view of one of the shaft or thill ends. Fig. 4 is a detail sectional plan of the coupling between the rein-guard and the thill or shaft end, and Fig. 5 is a cross-section on the line 5 5 in Fig. 4.

The shafts or thills 10 may be of any usual kind and terminate at their front ends in the customary ferrules 11, while projecting from the tip of each thill or shaft is a head or bolt 12, preferably of cylindrical shape, which is provided at a point next the end of the thill with an annular groove 13, which is intersected by the longitudinal grooves 14, made in the upper and lower sides of the bolt. These grooves 13 and 14 are adapted to receive the lugs 15, which project inward from the coupling-sleeves 16 on the ends of the guard 17. The guard 17 is firmly secured to the sleeves 16 and is adapted to extend across and close the ends of the shafts 10, and it is made somewhat shorter than the natural distance between the shafts, so that the latter have to be sprung toward each other in order to enable the coupling to be made between the guard and shafts, and after it is done the spring of the shafts holds the guard taut. The guard 17 is preferably of flexible material, such as a leather strap, although any suitable substance may be used in its manufacture.

To attach or detach the guard, it is necessary to turn the sleeves 16 so as to bring the lugs 15 into registry with the grooves 14, and when in this position the sleeves may be easily slipped on or off the bolts 12, but when pushed on and turned around so that the guard extends horizontally across the ends of the shafts the lugs 15 lie in the grooves 13 and do not register with the grooves 14 and there is no danger of the guard getting loose.

When the guard is first adjusted on the thills or shafts, the natural spring of the latter straightens the guard, as described, and this also has a tendency to hold the parts from working, and there is no danger of the sleeves 16 becoming accidentally detached from the bolts 12.

It will be seen from the above description that when the guard is adjusted on the thills it forms practically a continuous thill or shaft and there is absolutely no corner or place on which the reins may catch.

Having thus described my invention, I claim as new and desire to secure by Letters Patent—

The combination with vehicle-thills, of ferrules on the thills, each having a forwardlyextending bolt provided with an annular groove and a longitudinal groove, coupling-sleeves having the interior lugs to pass into the grooves, and a connection between the sleeves, the said connection being shorter than the natural distance between the ends of the thills, whereby the spring of the thills will have an outward strain on the connection to prevent accidental disengagement of the parts, substantially as specified.

THOMAS THOMPSON.

Witnesses:
  C. E. DICKINSON,
  R. V. DICKINSON.